(12) United States Patent
Bussinah

(10) Patent No.: US 9,077,790 B1
(45) Date of Patent: Jul. 7, 2015

(54) CELL PHONE AUXILIARY LENS HOLDER

(71) Applicant: Stephen P. Bussinah, Dunedin, FL (US)

(72) Inventor: Stephen P. Bussinah, Dunedin, FL (US)

( * ) Notice: Subject to any disclaimer, the term of this patent is extended or adjusted under 35 U.S.C. 154(b) by 15 days.

(21) Appl. No.: 14/150,522

(22) Filed: Jan. 8, 2014

(51) Int. Cl.
*H04W 88/02* (2009.01)
*H04M 1/02* (2006.01)

(52) U.S. Cl.
CPC ............ *H04M 1/0264* (2013.01); *H04W 88/02* (2013.01)

(58) Field of Classification Search
CPC ............ G06F 1/1632; H04N 1/00246; H04N 5/2254; H04N 5/2252; H04M 1/21; H04W 88/02
USPC .................. 455/556.1, 566, 66.1, 550.1, 90.3, 455/575.1, 557
See application file for complete search history.

(56) References Cited

U.S. PATENT DOCUMENTS

| | | | |
|---|---|---|---|
| 6,889,006 B2 | 5/2005 | Kobayashi | |
| 7,495,852 B2 | 2/2009 | Gutierrez | |
| 8,073,324 B2 | 12/2011 | Tsai | |
| 2013/0331148 A1* | 12/2013 | Brough | 455/557 |
| 2014/0313390 A1* | 10/2014 | Uemura et al. | 348/335 |
| 2015/0042873 A1* | 2/2015 | Hunt | 348/373 |

* cited by examiner

*Primary Examiner* — Pablo Tran
(74) *Attorney, Agent, or Firm* — Crossley Patent Law

(57) ABSTRACT

A cell phone auxiliary lens holder including a body removably attached to an existing cell phone holder configured to hold a cell phone having an existing built-in lens for a built-in digital photography device so that an attachable binocular lens of existing binoculars is aligned with the existing built-in lens on the existing cell phone to produce a desired digital photographic image modified by the attachable binocular lens.

The body includes an open front side and a closed rear side having at least one opening configured to align with the existing built-in lens on the existing cell phone. The body also includes an outer wall continuously disposed between the front side and the rear side and a cavity therein configured to conform to and receive an eyepiece end of the existing binoculars. The rear side removably attaches to a forward outer wall of the existing cell phone holder.

2 Claims, 3 Drawing Sheets

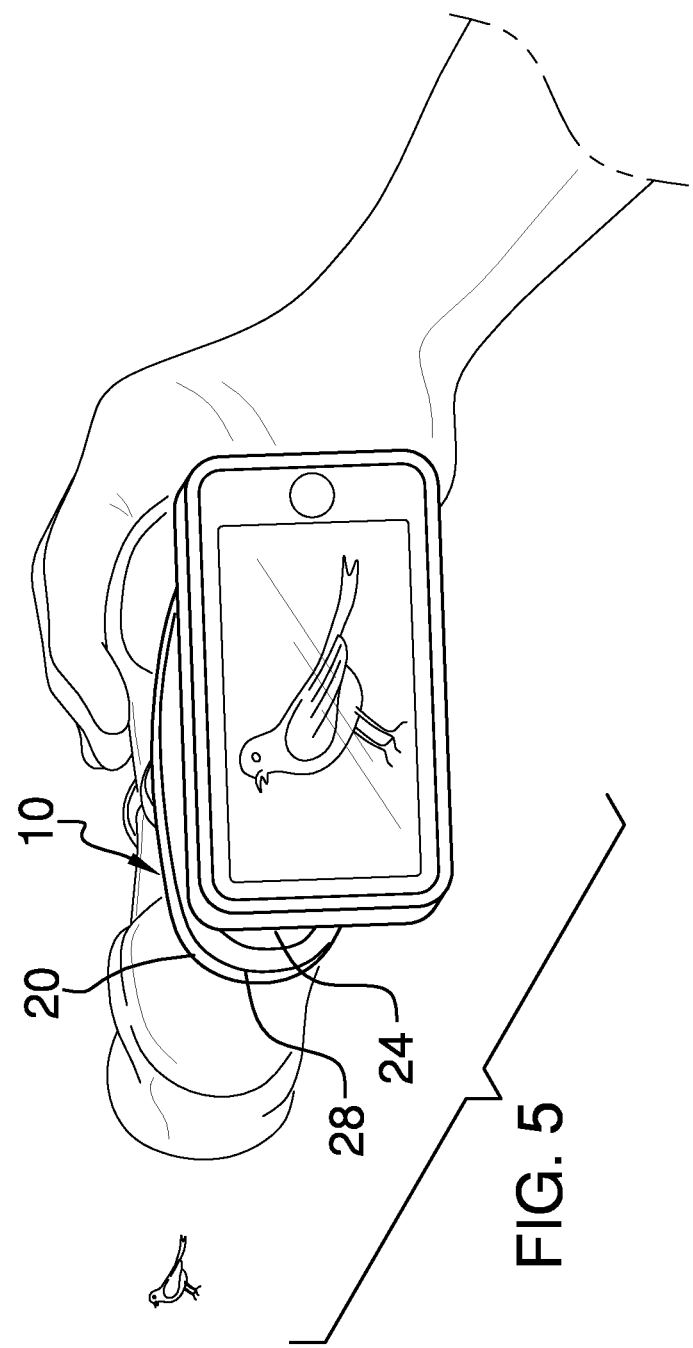

CELL PHONE AUXILIARY LENS HOLDER

BACKGROUND OF THE INVENTION

Various types of camera attachments are known in the prior art. However, what is needed is a cell phone auxiliary lens holder that attaches to an existing cell phone holder and aligns an existing binocular lens with an existing cell phone camera lens.

FIELD OF THE INVENTION

The present invention relates to attachments for cameras, and more particularly, to a cell phone auxiliary lens holder that attaches to an existing cell phone holder and aligns an existing binocular lens with an existing cell phone camera lens.

SUMMARY OF THE INVENTION

The general purpose of the present cell phone auxiliary lens holder, described subsequently in greater detail, is to provide a cell phone auxiliary lens holder which has many novel features that result in a cell phone auxiliary lens holder which is not anticipated, rendered obvious, suggested, or even implied by prior art, either alone or in combination thereof.

To accomplish this, the present cell phone auxiliary lens holder includes a body removably attached to an existing cell phone holder configured to hold a cell phone having an existing built-in lens for a built-in digital photography device so that an attachable binocular lens of existing binoculars is aligned with the existing built-in lens on the existing cell phone to produce a desired digital photographic image modified by the attachable binocular lens. The image from the binoculars is viewed through a view finder of the existing cell phone.

The body includes an open front side and a closed rear side having at least one opening. The opening is configured to align with the existing built-in lens on the existing cell phone. The body also includes an outer wall continuously disposed between the front side and the rear side. A cavity is continuously disposed between the front side, the rear side, and the outer wall. The rear side removably attaches to a forward outer wall of the existing cell phone holder. The cavity is configured to conform to and receive an eyepiece end of the existing binoculars.

The cavity is kidney shaped, has a bottom side with an inward curve centrally disposed on the bottom side to prevent the binoculars from sliding side-to-side and to eliminate extraneous light.

The body is formed of materials devised to support the binoculars as the binoculars are attached to the cell phone holder.

Thus has been broadly outlined the more important features of the present cell phone auxiliary lens holder so that the detailed description thereof that follows may be better understood and in order that the present contribution to the art may be better appreciated.

BRIEF DESCRIPTION OF THE DRAWINGS

FIGURES

Figure 1:
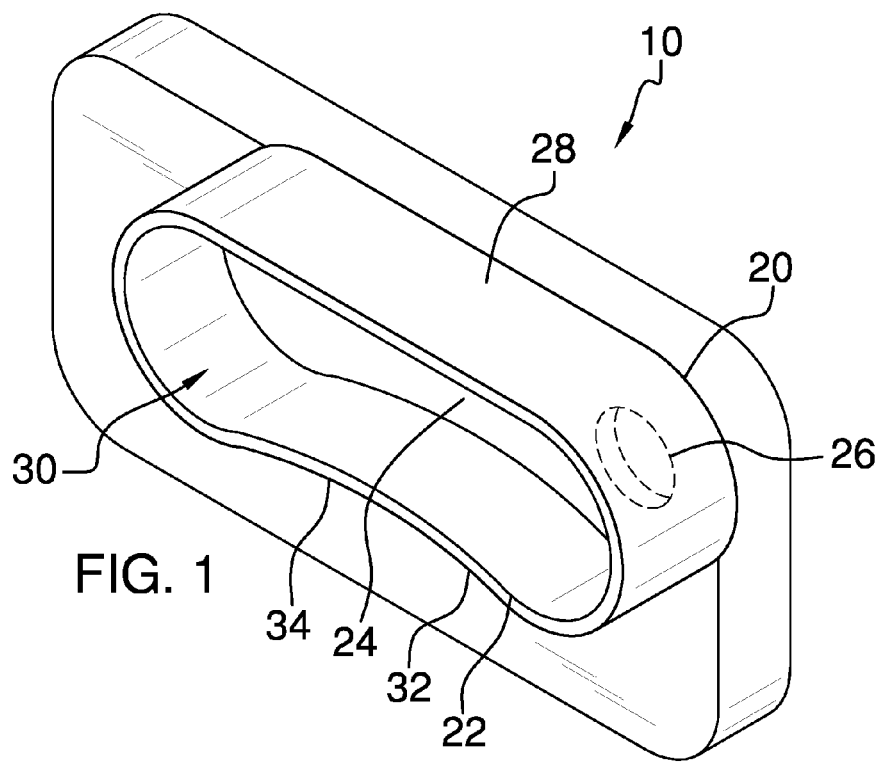
Figure 2:
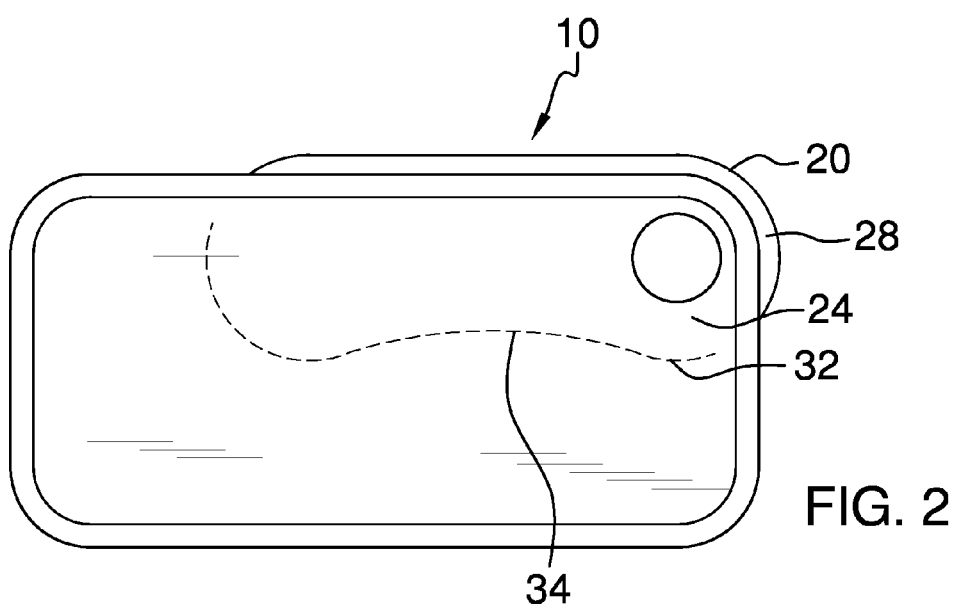
Figure 3:
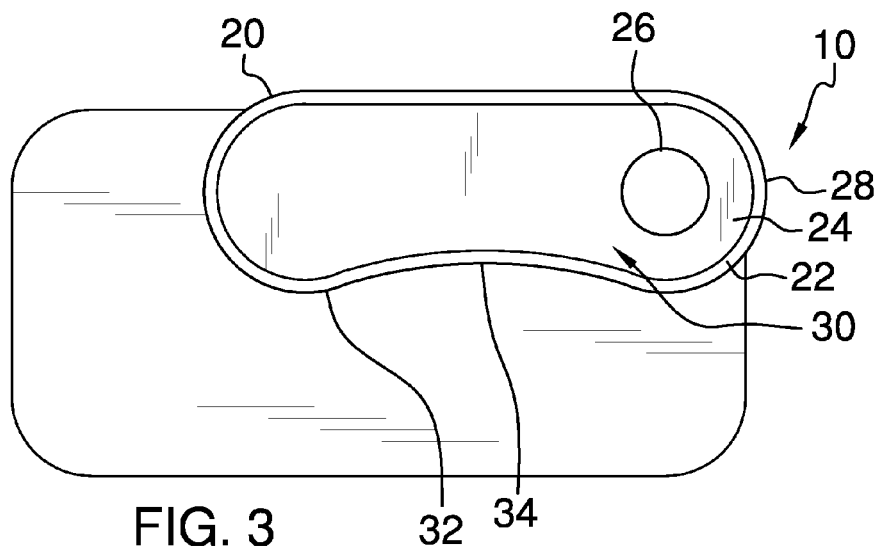
Figure 4:
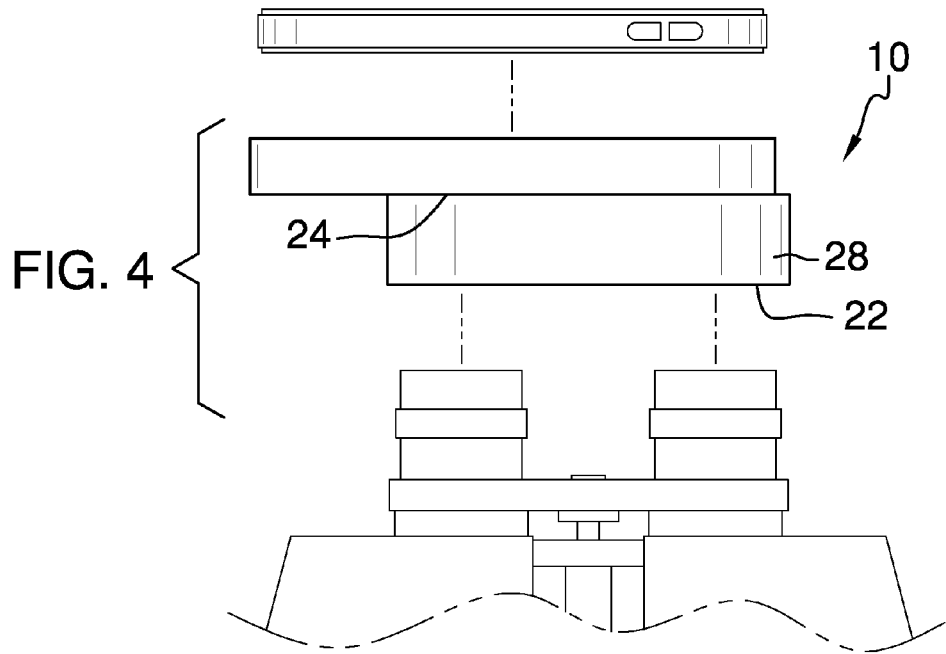

FIG. 1 is an isometric view.
FIG. 2 is a rear elevation view.
FIG. 3 is a front elevation view.
FIG. 4 is a top plan view.
FIG. 5 is an in-use view.

DETAILED DESCRIPTION OF THE DRAWINGS

With reference now to the drawings, and in particular FIGS. 1 through 5 thereof, an example of the instant cell phone auxiliary lens holder employing the principles and concepts of the present cell phone auxiliary lens holder and generally designated by the reference number 10 will be described.

Referring to FIGS. 1 through 5 the present cell phone auxiliary lens holder 10 is illustrated. The cell phone auxiliary lens holder 10 includes a body 20 removably attached to an existing cell phone holder configured to hold a cell phone having an existing built-in lens for a built-in digital photography device so that an attachable binocular lens of existing binoculars is aligned with the existing built-in lens on the existing cell phone to produce a desired digital photographic image modified by the attachable binocular lens.

The body 20 includes an open front side 22 and a closed rear side 24 having at least one opening 26. The opening 26 is configured to align with the existing built-in lens on the existing cell phone. The body 20 also includes an outer wall 28 continuously disposed between the front side 22 and the rear side 24. A cavity 30 is continuously disposed between the front side 22, the rear side 24, and the outer wall 28. The rear side 24 removably attaches to a forward outer wall of the existing cell phone holder so that binocular lens and the camera lens are aligned. The cavity 30 is configured to conform to and receive an eyepiece end of the existing binoculars.

The cavity 30 is kidney shaped, has a bottom side 32 with an inward curve 34 centrally disposed on the bottom side 32 to prevent the binoculars from sliding side-to-side and to eliminate extraneous light.

What is claimed is:

1. A cell phone auxiliary lens holder comprising:
   a body removably attached to an existing cell phone holder configured to hold a cell phone having an existing built-in lens for a built-in digital photography device so that an attachable binocular lens of existing binoculars is aligned with the existing built-in lens on the existing cell phone to produce a desired digital photographic image modified by the attachable binocular lens;
   wherein the body comprises:
      an open front side;
      a closed rear side having at least one opening, the opening configured to align with the existing built-in lens on the existing cell phone;
      an outer wall continuously disposed between the front side and the rear side; and
      a cavity continuously disposed between the rear side, the front side, and the outer wall;
      wherein the rear side removably attaches to a forward outer wall of the existing cell phone holder; and
      wherein the cavity is configured to conform to and receive an eyepiece end of the existing binoculars.

2. The cell phone auxiliary lens holder of claim 1 wherein the cavity is kidney-shaped and comprises:
   a bottom side; and
   an inward curve centrally disposed on the bottom side.

\* \* \* \* \*